(12) United States Patent
Cantrell

(10) Patent No.: US 11,986,833 B2
(45) Date of Patent: May 21, 2024

(54) HEMP FLOWER MATERIAL STRIPPING MACHINE AND METHOD

(71) Applicant: Laurie Cantrell, Fayetteville, TN (US)

(72) Inventor: Laurie Cantrell, Fayetteville, TN (US)

(*) Notice: Subject to any disclaimer, the term of this patent is extended or adjusted under 35 U.S.C. 154(b) by 269 days.

(21) Appl. No.: 17/169,967

(22) Filed: Feb. 8, 2021

(65) Prior Publication Data

US 2022/0250083 A1 Aug. 11, 2022

(51) Int. Cl.
*A01D 45/06* (2006.01)
*B02C 19/00* (2006.01)
*B02C 23/02* (2006.01)

(52) U.S. Cl.
CPC ........ *B02C 19/0056* (2013.01); *A01D 45/065* (2013.01); *B02C 23/02* (2013.01)

(58) Field of Classification Search
CPC .......... A01G 5/00–5/06; A01D 45/065; A01D 45/16; A24B 5/00–5/16; A23N 15/00–15/12; B02C 4/00–4/44
See application file for complete search history.

(56) References Cited

U.S. PATENT DOCUMENTS

| | | | |
|---|---|---|---|
| 1,518,349 A * | 12/1924 | Olson | A24B 5/02 131/323 |
| 4,257,295 A * | 3/1981 | Patel | H01R 43/28 83/628 |
| 4,838,129 A | 6/1989 | Cope | |
| 5,177,941 A | 1/1993 | Tharp et al. | |
| 10,301,242 B2 | 5/2019 | Zhang et al. | |
| 10,441,617 B2 | 10/2019 | Lewis et al. | |
| 10,925,213 B1 * | 2/2021 | Cohen | A01D 45/16 |
| 2016/0331019 A1 * | 11/2016 | Evans | A24B 5/06 |
| 2016/0374386 A1 * | 12/2016 | Desmarais | A01D 46/02 460/137 |
| 2018/0077866 A1 * | 3/2018 | Perez | A01D 43/086 |
| 2018/0303033 A1 * | 10/2018 | Jones | A01D 45/065 |

(Continued)

FOREIGN PATENT DOCUMENTS

| | | | |
|---|---|---|---|
| CA | 2665876 A1 * | 11/2010 | ............. A23N 15/01 |
| EP | 0383410 A1 * | 8/1990 | |

(Continued)

*Primary Examiner* — Thomas B Will
*Assistant Examiner* — Madeline I Runco
(74) *Attorney, Agent, or Firm* — Lanier Ford Shaver & Payne, PC; Gerald M. Walsh

(57) ABSTRACT

A hemp flower, bud, and leaf material stripping machine having a housing, a motor and gearbox that drive a pair of rollers inside the housing, an adjustable locking shaft that adjusts and maintains a space and pressure between the rollers, and a series of feed holes of different diameters on a front side of the housing. Each feed hole is constructed to strip flowers, buds, and leaves from a hemp stem as the stem is inserted into a feed hole and is pulled through the feed hole by the rollers. The flowers, buds, and leaves are severed from the stem at an exterior of the front side of the housing, without damage to the flowers, buds, and leaves. The feed hole is constructed with close tolerance so that the stem can pass through the feed hole but the flowers, buds, and leaves cannot. Hemp stems are stripped in seconds. The flowers, buds, and leaves are not crushed, cut, torn, or compressed as they are severed and fall into a container.

8 Claims, 4 Drawing Sheets

(56) References Cited

U.S. PATENT DOCUMENTS

2021/0169119 A1\* 6/2021 Jasiewicz ............... A01D 46/28
2022/0211093 A1\* 7/2022 Bouchier ................ A24B 5/06

FOREIGN PATENT DOCUMENTS

| EP | 3622807 | A1 | \* | 3/2020 | ............. A01F 11/00 |
| KR | 900009828 | Y1 | \* | 10/1990 | |
| KR | 20140011066 | A | \* | 1/2014 | |
| WO | WO-2018014135 | A1 | \* | 1/2018 | ............... A01G 3/00 |
| WO | WO-2018048503 | A1 | \* | 3/2018 | ............... A24B 5/06 |

\* cited by examiner

HEMP FLOWER MATERIAL STRIPPING MACHINE AND METHOD

FIELD OF THE INVENTION

This invention relates generally to floral implements, and more particularly to a flower, bud, and leaf stripping implement particularly useful in stripping flowers, buds, and leaves from hemp stems.

BACKGROUND OF THE INVENTION

Hemp is a plant in the Cannabis genus and has important agricultural and medicinal value. In the United States, 30 states have passed comprehensive medical cannabis laws, which allow for the use of cannabis products. Of these 30 states, eight have legalized the use and sale of cannabis products without requirement for a physician's prescription. The main cannabinoid in hemp plants is cannabidiol (CBD) with no more than 0.3% tetrahydrocannabinol (THC). Hemp-derived CBD products are legal in all 50 states, as long as they contain no more than 0.3% THC. CBD is not neurotoxic and has significant medicinal value. CBD and other cannabinoids can be extracted from the flowers, buds, and leaves of hemp after they have been removed for the hemp stem. The extraction technique includes drying, grinding, soaking, and extracting the flowers, buds and leaves and concentrating and separating the active ingredients. At present, the process of removing the flowers, buds, and leaves from the stem is excessively time consuming because it is desirable that the flowers, buds, and leaves are not damaged or crushed so as to achieve optimum yield of product during the extraction process. What is needed is a machine and method that will remove the flowers and related materials from the stem while doing very little damage to the flower.

SUMMARY OF THE INVENTION

The present invention is a hemp flower, bud, and leaf material stripping machine having a housing with a front side, a rear side, a right side, a left side, a top end, and a bottom end, defining an interior. A pair of rollers are mounted in the interior of the housing near the front side of the housing. A motor and gearbox drive the rollers to rotate in opposite directions. An adjustable locking shaft adjusts and maintains a space between the rollers. A series of feed holes of different diameters are on the front side of the housing. Each feed hole is constructed to strip flowers, buds, and leaves from a stem as the stem is inserted into the feed hole and as the stem is pulled through the space between the rollers by the rotation of the rollers. Each feed hole is constructed so that flowers, buds, and leaves are stripped from the stem at an exterior of the front side of the housing, without damage to the flowers, buds, and leaves.

The pair of rollers include an upper roller and a lower roller. The gearbox drives the lower roller to rotate in one direction and the lower roller drives the upper roller to rotate in a direction opposite to that of the lower roller so that the upper roller and the lower roller pull the stem through the space between the rollers towards the rear side of the housing. The upper roller is mounted in a yoke, wherein the yoke has a bridge member with one end of the bridge member connecting, through an opening in the housing, to a threaded adjusting guide mount. The threaded adjusting guide mount is connected rotatably and threadably to the adjustable locking shaft.

The adjustable locking shaft is mounted rotatably in a top mount near the top end of the housing and in a bottom mount near the bottom end of the housing. The adjustable locking shaft is constructed to raise or lower the upper roller to increase or decrease the space between the rollers when the adjustable locking shaft is rotated in one direction or rotated in an opposite second direction. Raising the upper roller decreases the grip of the rollers on the stem and lowering the upper roller increases the grip of the rollers on the stem. The plane of the rollers is tilted away from the front side of the housing so that a stem is pulled in a downward direction through the space between the rollers towards the rear side of the housing by the rotation of the rollers.

The hemp flower, bud, and leaf material stripping machine of the present invention provides a simple, rapid, and inexpensive method for removing flowers, buds, and leaves from the stem of a hemp plant without damaging the flowers, buds, and leaves. A hemp stem is placed in a hole in a housing having a pair of rollers. The hemp stem is pushed through the hole to the rollers which grasp the stem and pull the stem through the space between the rollers. The flowers, buds, and leaves are cleaved from the stem outside the housing when stem is pulled through the hole because the hole is sized to allow only the passage of the stem. The flowers, buds, and leaves are fall undamaged into a container for processing. The grasping force of the rollers is increased by decreasing the space between the rollers and is decreased by increasing the space between the rollers.

The hemp flower, bud, and leaf material stripping machine of the present invention has several advantages. Hemp stems are stripped in seconds. The flowers, buds, and leaves are not crushed, cut, torn, or compressed. No special skill is needed to operate the stripping machine. Two people can simultaneously operate the stripping machine. The stripping machine is inexpensive to manufacture and maintain.

DESCRIPTION OF THE INVENTION

Figure 1:
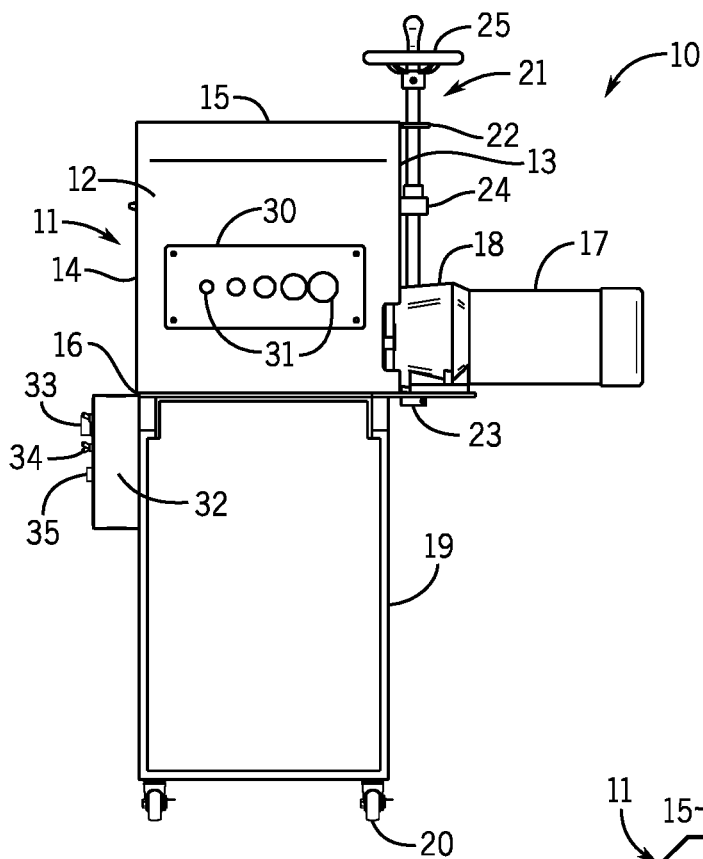
FIG. 1 is a front elevation view of a hemp flower stripping machine of the present invention.

FIG. 1 shows a front elevation view of the hemp flower stripping machine 10. The stripping machine 10 has a housing 11 with a front side 12, a right side 13, a left side 14, a top end 15, and a bottom end 16. A motor 17 and a gear box 18 are attached to the housing 11 near its bottom end 16 and on its right side 13. The housing 11 is, preferably, mounted on a stand 19 having wheels 20. An adjustable locking shaft 21 is mounted rotatably to the housing 11 on the right side 13 and at a rear side 26 (see FIG. 2) with a top mounting member 22 and a bottom mounting member 23. The adjustable locking shaft 21 passes through a threaded adjusting guide mount 24. A top end of the adjustable locking shaft 21 has a handle 25 for rotating the shaft 21.

A feed plate 30 is attached on the front side 12. The feed plate 30 has a plurality of different sized feed holes 31 for inserting hemp stems into an interior of the housing 11 and between a pair of rollers. The housing 11 has a control box 32 attached to the stand 19. The control box 32 has an on/off switch 33 for a power source, a speed control switch 34, a forward/reverse switch 35.

Figure 2:
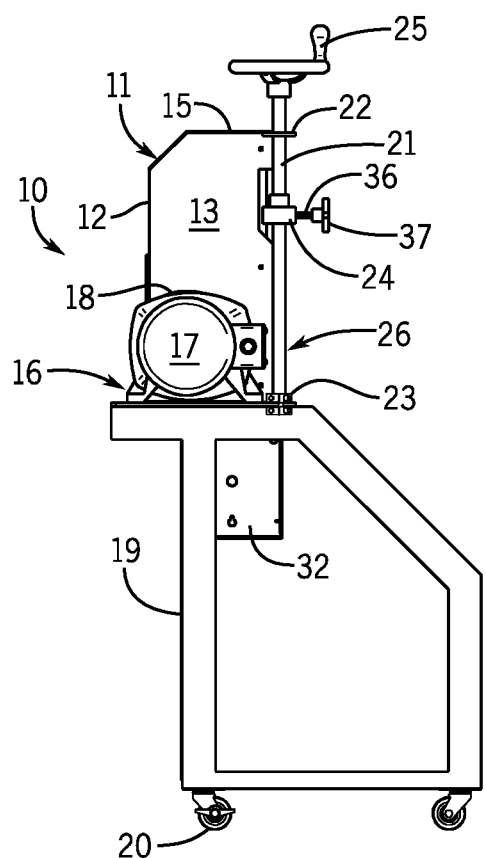
FIG. 2 is a right side elevation view of the hemp flower stripping machine.

FIG. 2 shows a right sided view of the stripping machine 10. FIG. 2 further shows a rear side 26 of the housing 11 and a locking screw 36 with a handle 37 in the threaded adjusting guide mount 24.

Figure 3:
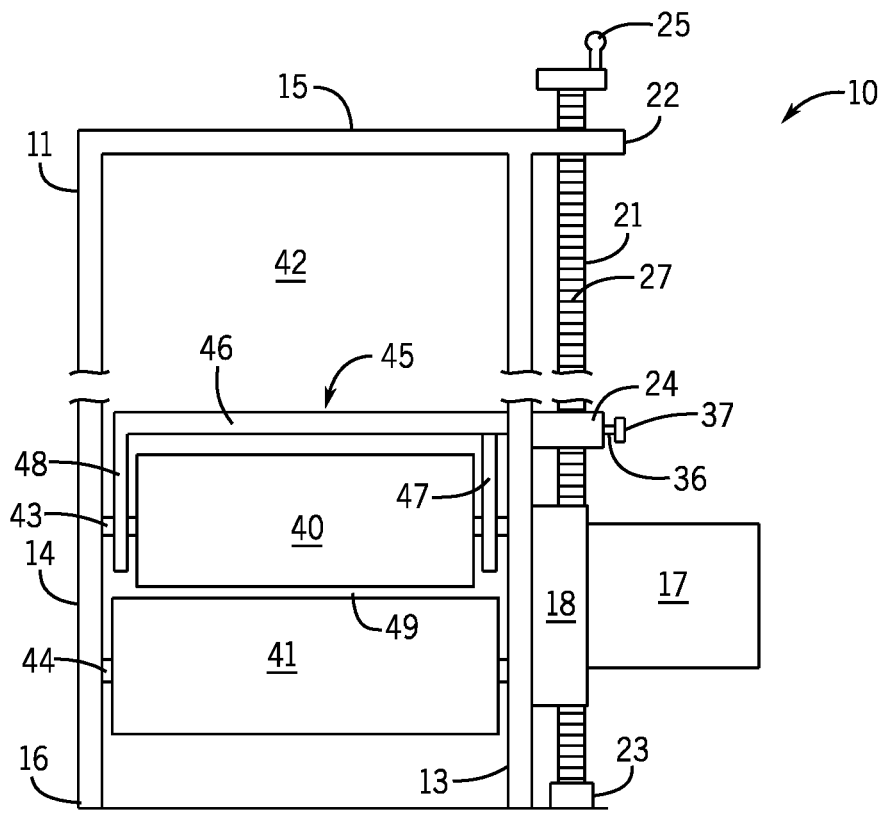
FIG. 3 is a front sectional illustration of the press rollers and adjustable locking track of the stripping machine.

FIG. 3 is a front sectional illustration of spaced-apart press rollers 40 and 41 and the adjustable locking shaft 21. A top press roller 40 and a bottom press roller 41 are shown in the interior 42 of the housing 11. The top roller 40 is mounted on a drive shaft 43 and the bottom roller 41 is mounted on a bottom shaft 44. The shafts are mounted rotatably in the sides 13 and 14. Shaft 43 in roller 40 is also mounted vertically and slideably in sides 13 and 14. Shaft 43 is mounted in a yoke 45 having a bridge member 46 with a right leg 47, and a left leg 48. Shaft 43 of roller 40 is mounted rotatably in legs 47 and 48. The threaded adjusting mount 24 is attached to the right side of the bridge member 46 which extends out through an opening in the right side 13 of the housing 11. A space 49 is shown between the top roller 40 and the bottom roller 41. The rollers 40 and 41 are, preferably, 6 to 8 inches in diameter and may be coated with rubber or plastic.

When the adjustable locking shaft 21 is rotated in a first direction the threads 27 on the shaft 21 will engage threads in the threaded adjusting guide mount 24 which will cause the guide mount 24 to move, for example, up the shaft 21. Because the guide mount 24 is attached to the bridge member 46 of the yoke 45, the yoke 45 will also move upward, thereby moving roller 40 upward and increasing the space 49 and/or decreasing the tension between rollers 40 and 41. If the shaft 21 is rotated in a second opposite direction the yoke 45 will move downward, thereby decreasing the space 49 and/or increasing the tension between rollers 40 and 41.

Figures 4A, 4B:
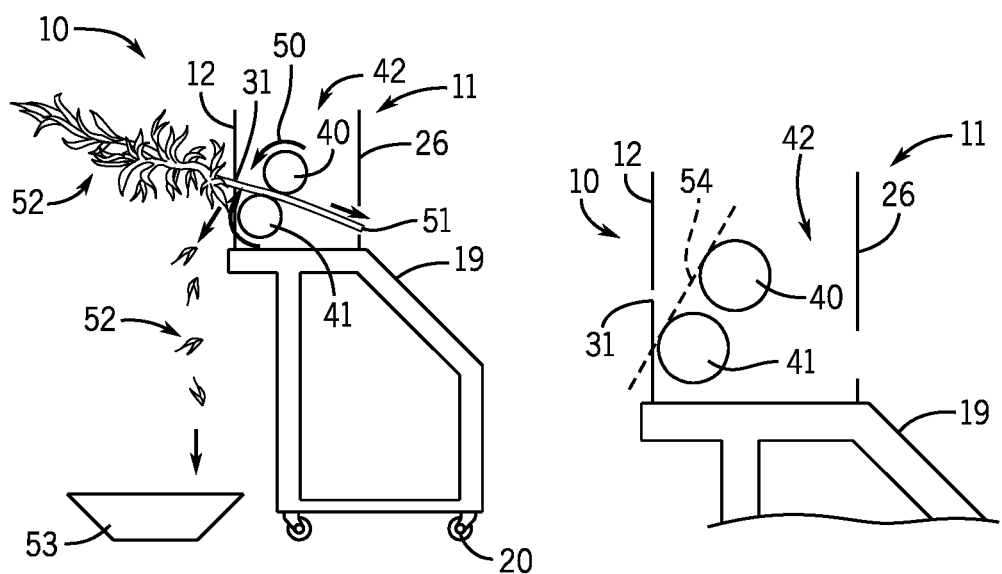
FIG. 4A is a right side illustration of the press rollers striping the flowers from a hemp stem.
FIG. 4B is a right side illustration of the press rollers having a plane tilted away from a front side of the housing.

FIG. 4A is a right sided sectional illustration of the press rollers 40 and 41 stripping the flowers 52 from a hemp stem 51. The rollers 40 and 41 are driven by the motor 17 and gearbox 18 to rotate in opposite directions, shown by the arrows 50. The rate of rotation is, preferably, 1-80 rpm. The direction of rotation and the size of the space 49 causes the hemp stem 51 to be pulled, preferably rapidly, through opening 30 and between the rollers 40 and 41. There is insufficient space around the hemp stem for the hemp flower material 52 to pass through the hole 31 as the stem is pulled through hole 31 by rollers 40 and 41. The pulling force (rotational speed) of the rollers 40 and 41 can be adjusted as desired. Surprisingly, the hemp flower material 52 is stripped or sheared off the hemp stem 51 with no observable damage to the flower material 52. An advantage of this invention is that the flower material 52 is being removed from stem 51 outside of the housing 11 so that the flower material 52 can be easily collected as it falls into a collecting bin 53.

The rollers 40 and 41 are configured to rotate in opposite directions by methods known in the art. For example, each drive shaft 43, 44 has a drive gear on the right end of the drive shaft. A first drive gear on the lower shaft 44 is driven by the motor 17 in a first direction. An idler gear arrangement (not shown) located between a second drive gear on the lower shaft 44 and the drive gear on the upper shaft 43, drives the drive gear on the upper shaft 43 in second direction of rotation opposite to the direction of rotation of the lower shaft 44 (see U.S. Pat. No. 4,257,295 which is incorporated herein by reference). A tangential relationship between the drive gear on the upper shaft 43 and the idler gear arrangement will keep these gears engaged as the upper shaft 43 is raised and lowered by operation of the adjustable locking shaft 21.

FIG. 4B is a right-side sectional illustration showing that the plane of the press rollers 40, 41 is tilted away from a front side 12 of the housing 11. The orientation of the plane is shown by dashed line 54. The tilting of the rollers 40, 41 facilitates insertion of the stem between the rollers 40, 41. As a user inserts the stem through a feed hole 31, the tip of the stem engages the top roller 40 which immediately drives the stem down to the bottom roller 41 and into the space 49 between the rollers. The stem is then immediately pulled through the rollers 40, 41 and discarded near the rear side 26 of the housing 11.

Figure 5A:
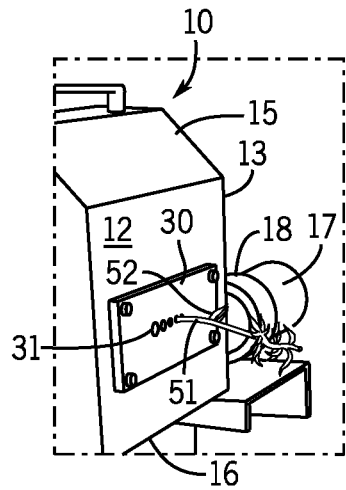
FIG. 5A is a front, left side perspective view of the of the flower stripping machine with a hemp stem positioned in front of a feed hole.
Figure 5B:
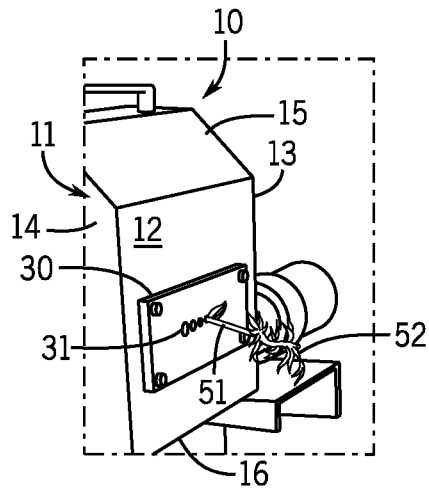
FIG. 5B is the FIG. 5A with the hemp stem inserted into the proper sized feed hole.
Figure 5C:
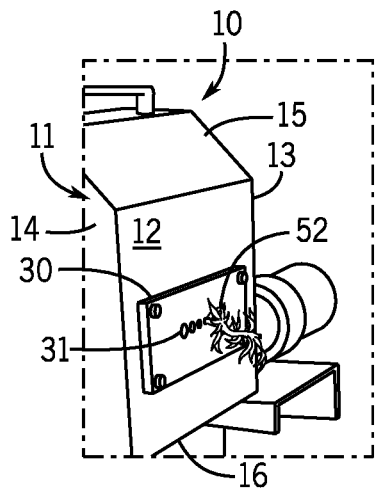
FIG. 5C is the FIG. 5A with the hemp stem beginning to be pulled into the stripping machine.
Figure 5D:
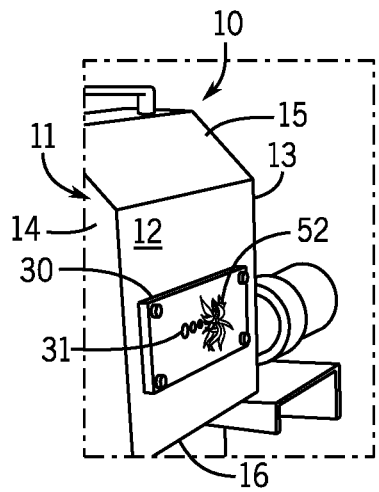
FIG. 5D is the FIG. 5A with most of the hemp stem inserted and pulled into the stripping machine and with the flower material clumping together.
Figure 5E:
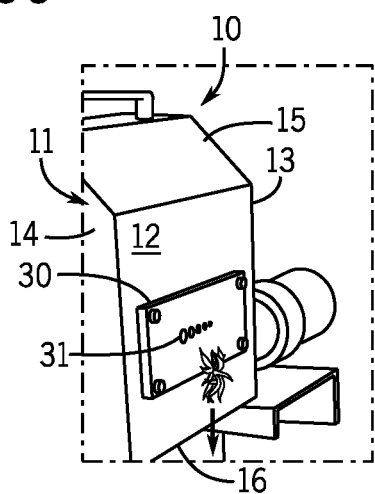
FIG. 5E is the FIG. 5A with the hemp stem completely pulled into the stripping machine and the flowers completely stripped from the stem and falling downward for collection.

FIG. 5A-5E illustrates a method of use of this invention. FIG. 5A shows a front, left side perspective view of the stripping machine 10 with a hemp stem 51 positioned at an appropriately sized feed hole 31. The adjustable locking shaft 21 is rotated to adjust the space 49 between the rollers 40 and 41 and then locked into position by turning the locking screw 36 and handle 37. FIG. 5B shows the hemp stem 51 pushed into the feed hole 31. FIG. 5C shows the hemp stem 51 being pulled through the feed hole 31 and the flower material beginning to clump. FIG. 5D shows that the hemp stem 51 has been pulled completely from the feed hole 31 and the flower material 52 is stripped from hemp stem 51. FIG. 5E shows the clumped flower material 52 falling from the feed hole 31.

Figure 6A:
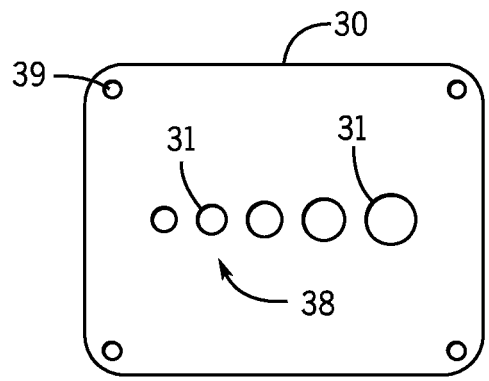
FIG. 6A is an enlarged view of a feed hole plate showing a series of different size feed holes.
Figure 6B:
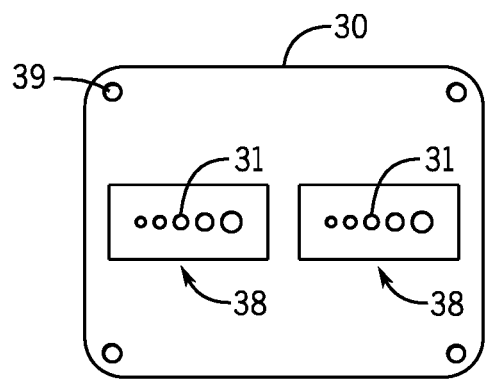
FIG. 6B is an enlarged view of a feed hole plate showing two series feed holes.
Figure 6C:
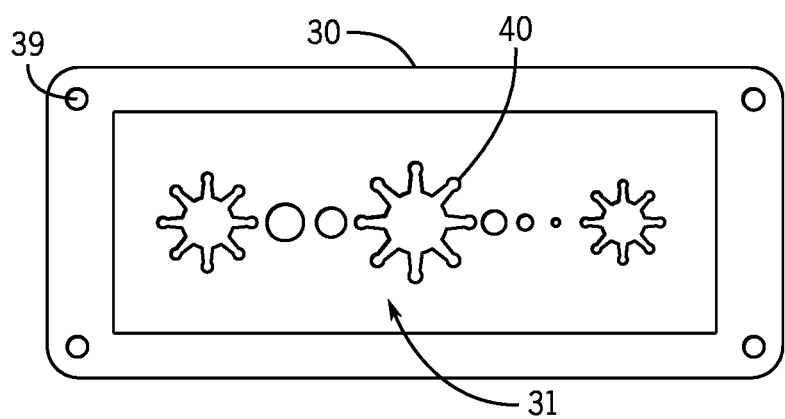
FIG. 6C is an enlarged view of an alternant embodiment of the feed hole plate.

FIG. 6A shows an enlarged view of the feed hole budplate 30, with a series 38 of holes 31 that are designed to provide a close tolerance fit with hemp stems 51 of different thickness. The diameter of the holes 31 can range from 0.5 to 20 mm. The feed holes 31 can be placed directly on the front of the housing 11, or fashioned as inserts and screwed into the front of the housing 11, or, preferably, formed in a feed hole plate 30 which has bolt holes 39 for bolting the feed hole plate 30 over an opening in the front 12 of the housing 11, adjacent to the rollers 40 and 41. The feed hole plate 30 can have two or more series 38 of holes 31 to accommodate two or more users. FIG. 6C shows an alternant embodiment of the feed hole plate 30 wherein some of the holes 31 have projections 40 extending from the perimeter of the hole 31 to further facilitate removal of flowers, buds, and leaves.

The foregoing description illustrates and describes the disclosure. Additionally, the disclosure shows and describes only the preferred embodiments but, as mentioned above, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art.

The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claims.

I claim:

1. A hemp flower, bud, and leaf material stripping machine, comprising:
   a) a housing having a front, a rear, a first side, a second side opposite the first side, a top end, and a bottom end, defining an interior;
   b) an upper roller and a lower roller positioned in the interior of the housing near the front of the housing wherein the upper roller is mounted in a yoke, wherein the yoke has a bridge member, and wherein an end of the bridge member has a threaded adjusting guide mount that extends out of the housing on a first side of the housing;
   c) a motor and gearbox attached to the outside of the housing which drive the rollers to rotate in opposite directions;
   d) an adjustable locking shaft positioned rotatably and threadably in the threaded adjusting guide mount, wherein the adjustable locking shaft is mounted on the first side of the housing at the top end of the housing and at the bottom end of the housing; and
   e) a series of feed holes of different diameters on the front side of the housing, wherein each feed hole is constructed to strip flowers, buds, and leaves from a stem as the stem is inserted into the feed hole and as the stem is pulled through the space between the rollers by the rotation of the rollers.

2. The hemp flower, bud, and leaf material stripping machine of claim 1, wherein each roller has a drive gear and the gearbox drives the lower roller to rotate in one direction and the gear box drives the upper roller to rotate in a direction opposite to that of the lower roller so that the upper roller and the lower roller pull the stem through the space between the rollers towards the rear side of the housing.

3. The hemp flower, bud, and leaf material stripping machine of claim 1, wherein the adjustable locking shaft is constructed to raise or lower the bridge member to increase or decrease the space between the rollers when the adjustable locking shaft is rotated in one direction or rotated in an opposite second direction, wherein raising the bridge member decreases the grip of the rollers on the stem and lowering the bridge member increases the grip of the rollers on the stem.

4. The hemp flower, bud, and leaf material stripping machine of claim 1, further comprising the plane of the rollers being tilted away from the front side of the housing so that a stem is pulled in a downward direction through the space between the rollers towards the rear side of the housing by the rotation of the rollers.

5. A hemp flower, bud, and leaf material stripping machine, comprising:
   a) a housing having a front, a rear, a first side, a second side opposite the first side, a top end, and a bottom end, defining an interior;
   b) an upper roller and a lower roller positioned in the interior of the housing near the front of the housing wherein the upper roller is mounted in a yoke, wherein the yoke has a bridge member, and wherein an end of the bridge member has a threaded adjusting guide mount that extends out of the housing on a first side of the housing;
   c) a motor and gearbox attached to the outside of the housing which drive the rollers to rotate in opposite directions;
   d) an adjustable locking shaft positioned rotatably and threadably in the threaded adjusting guide mount, wherein the adjustable locking shaft is mounted on the first side of the housing near the top end of the housing and near the bottom end of the housing; and
   e) a series of feed holes of different diameters on the front side of the housing, wherein each feed hole is constructed to strip flowers, buds, and leaves from a stem as the stem is inserted into the feed hole and as the stem is pulled through the space between the rollers by the rotation of the rollers, and wherein each roller has a drive gear and the gearbox drives the lower roller to rotate in one direction and the gearbox drives the upper roller to rotate in a direction opposite to that of the lower roller so that the upper roller and the lower roller pull the stem through the space between the rollers towards the rear side of the housing.

6. The hemp flower, bud, and leaf material stripping machine of claim 5, wherein the adjustable locking shaft is constructed to raise or lower the bridge member to increase or decrease the space between the rollers when the adjustable locking shaft is rotated in one direction or rotated in an opposite second direction, wherein raising the bridge member decreases the grip of the rollers on the stem and lowering the bridge member increases the grip of the rollers on the stem.

7. The hemp flower, bud, and leaf material stripping machine of claim 5, wherein the plane of the rollers is tilted away from the front side of the housing so that a stem is pulled in a downward direction through the space between the rollers towards the rear side of the housing by the rotation of the rollers.

8. A hemp flower, bud, and leaf material stripping machine, comprising:
   a) a housing having a front, aside, a first side, a second side opposite the first side, a top end, and a bottom end, defining an interior;
   b) an upper roller and a lower roller positioned in the interior of the housing near the front of the housing wherein the upper roller is mounted in a yoke, wherein the yoke has a bridge member, and wherein an end of the bridge member has a threaded adjusting guide mount that extends out of the housing on a first side of the housing;
   c) a motor and gearbox attached to the outside which drive the rollers to rotate in opposite directions;
   d) an adjustable locking shaft positioned rotatably and threadably in the threaded adjusting guide mount, wherein the adjustable locking shaft is mounted on the first side of the housing at the top end of the housing and at the bottom end of the housing; and e) a series of feed holes of different diameters on the front side of the housing, wherein each feed hole is constructed to strip flowers, buds, and leaves from a stem as the stem is inserted into a feed hole and as the stem is pulled through the space between the rollers by the rotation of the rollers, wherein each roller has a drive gear and the gearbox drives the lower roller to rotate in one direction and the gearbox drives the upper roller to rotate in a direction opposite to that of the lower roller so that the upper roller and the lower roller pull the stem through the space between the rollers towards the rear side of the housing, wherein the adjustable locking shaft is constructed to raise or lower the bridge member to increase or decrease the space between the rollers when the adjustable locking shaft is rotated in one direction or rotated in an opposite second direction, wherein raising the bridge member decreases the grip of the rollers on the stem and lowering the bridge member increases the grip of the rollers on the stem, and wherein the plane of the rollers is tilted away from the front side of the housing so that a stem is pulled in a downward direction through the space between the rollers towards the rear side of the housing by the rotation of the rollers.

\* \* \* \* \*